(12) United States Patent
Osaki

(10) Patent No.: US 7,256,964 B2
(45) Date of Patent: Aug. 14, 2007

(54) MAGNETIC TAPE APPARATUS INCLUDING A CIRCUMFERENTIAL SURFACE HAVING A GENERALLY FLAT PORTION BETWEEN PEAK PORTIONS AND METHOD FOR PRODUCING THE SAME

(75) Inventor: Hiroyuki Osaki, Miyagi (JP)

(73) Assignee: Sony Corporation, Tokyo (JP)

( * ) Notice: Subject to any disclaimer, the term of this patent is extended or adjusted under 35 U.S.C. 154(b) by 474 days.

(21) Appl. No.: 10/764,641

(22) Filed: Jan. 26, 2004

(65) Prior Publication Data

US 2004/0156147 A1 Aug. 12, 2004

(30) Foreign Application Priority Data

Jan. 28, 2003 (JP) ............................ P2003-018605

(51) Int. Cl.
*G11B 15/60* (2006.01)

(52) U.S. Cl. ................................................ 360/130.24

(58) Field of Classification Search ..................... None
See application file for complete search history.

(56) References Cited

U.S. PATENT DOCUMENTS 3,144,521 A * 8/1964 Kihara et al. ............... 360/271
3,725,606 A * 4/1973 Thompson ................... 360/101
4,257,076 A * 3/1981 Shimizu et al. ......... 360/130.24
5,220,475 A * 6/1993 Fujiki et al. ............ 360/130.24
5,627,705 A * 5/1997 Ibaraki et al. .......... 360/130.24
6,411,465 B1 * 6/2002 Obata et al. ............ 360/130.24
6,452,744 B1 * 9/2002 Tamaru et al. ......... 360/130.24

\* cited by examiner

*Primary Examiner*—David Davis
(74) *Attorney, Agent, or Firm*—Sonnenschein Nath & Rosenthal LLP

(57) ABSTRACT

To lower the coefficient of static friction of the circumferential surface of the guide or drum constituting the magnetic tape apparatus. A flat portion is formed between peak portions. The peak portions and flat portion are formed so that the relationship: a'<a is satisfied, where "a" represents a distance between the ridges of the peak portions, i.e., pitch of the peak portions, and "a'" represents a bottom width of the peak portions. When this relationship is satisfied between the peak portions and the flat portion, the total area of the meniscuses formed between the magnetic tape and the peak portions can be reduced, thus making it possible to lower the coefficient of static friction.

10 Claims, 12 Drawing Sheets

PRIOR ART

PRIOR ART

PRIOR ART

MAGNETIC TAPE APPARATUS INCLUDING A CIRCUMFERENTIAL SURFACE HAVING A GENERALLY FLAT PORTION BETWEEN PEAK PORTIONS AND METHOD FOR PRODUCING THE SAME

CROSS REFERENCE TO RELATED APPLICATIONS

The present document is based on Japanese Priority Document JP2003-018605, filed in the Japanese Patent Office on Jan. 28, 2003, the entire contents of which being incorporated herein by reference.

BACKGROUND OF THE INVENTION

1. Field of the Invention

The present invention relates to a magnetic tape apparatus and a method for producing the same. More particularly, the present invention is concerned with a magnetic tape apparatus for recording and/or reproducing information while sliding a magnetic tape against a drum or a guide, and a method for producing the apparatus.

2. Description of Related Art

In magnetic tape apparatuses, such as video tape recorder (VTR), desired information is recorded and/or reproduced in a state such that a magnetic tape is in sliding contact against a drum which having a magnetic head and a guide for guiding the magnetic tape.

FIG. 12 is a view showing the construction of a driving mechanism for magnetic tape in a rotary head type recording-reproducing apparatus which is one example of the magnetic tape apparatus. A magnetic tape 51 is in sliding contact against the individual circumferential surfaces of stationary guides 45, 46, rotary guides 47, 48, 49, 50, and a drum portion 40 which is constituted by a rotary drum 41 and a stationary drum 43, and a magnetic head 42 provided in the rotary drum 41 records and reproduces information on a recording layer formed on the magnetic tape 51.

The rotary drum 41 is rotatably supported with a shaft by the stationary drum 43 to form the drum portion 40. The magnetic tape 51 is designed so that the magnetic head 42 can follow a predetermined track in the magnetic tape 51. The magnetic tape 51 runs so that a lower edge 51b of the magnetic tape moves along a lead 44 formed in the stationary drum 43, controlling the position of the running magnetic tape. The rotary guides 47, 48, 49, 50 individually have a substantially cylindrical form having flanges formed at both ends, and control the vertical movement of the upper edge 51a and lower edge 51b of the magnetic tape 51 to prevent the magnetic tape 51 from shifting from the predetermined position.

FIG. 13 is a view showing a driving mechanism for magnetic tape in a stationary head type recording-reproducing apparatus which is one example of the magnetic tape apparatus. Like in the controlling of the position of the running magnetic tape 51 shown in FIG. 12, an upper edge 68a and a lower edge 68b of a magnetic tape 68 are controlled by flanges formed at rotary guides 62, 63, 64, 65, controlling the vertical movement of the magnetic tape 68 so that a magnetic head 61 follows a predetermined track in the magnetic tape 68. The rotary guides 62, 63, 64, 65 disposed on the front and back sides of a stationary drum 60 for supporting the magnetic head 61 control the position in the height direction so that the upper edge 68a and lower edge 68b of the magnetic tape 68 individually move along the flanges.

The rotary guides 47, 48, 62, 63 respectively control the positions of the upper edges 51a, 68a of the magnetic tapes 51, 68, and the rotary guides 49, 50, 64, 65 respectively control the positions of the lower edges 51b, 68b. For example, in the rotary head type recording-reproducing apparatus, the rotary guides 47, 48, 49, 50 are individually designed and arranged so that they are at a slight angle to the running direction of the magnetic tape 51 indicated by arrows shown in FIG. 14. As shown in FIG. 14A, the surface of the magnetic tape 51 slid against the rotary guide 47 receives a static frictional force, so that the magnetic tape 51 receives a force which spirally pushes the tape up from the circumferential surface of the rotary guide 47, but the position of the upper edge 51a of the magnetic tape 51 is controlled in the height direction by the upper flange 47a of the rotary guide 47. Further, as shown in FIG. 14B, the rotary guide 49 for controlling the position of the lower edge 51b in the height direction is arranged so that it leans in the opposite direction to the leaning direction of the rotary guide 47 with respect to the running direction of the magnetic tape 51 indicated by an arrow shown in the figure. The surface of the magnetic tape 51 slid against the rotary guide 49 receives a static frictional force, so that the magnetic tape 51 receives a force which spirally pushes the tape down from the circumferential surface of the rotary guide 49, but the position of the lower edge 51b of the magnetic tape 51 is controlled in the height direction by the lower flange 49b of the rotary guide 49. Similarly the above-described controlling of the vertical movement of the magnetic tape is carried out in the stationary head type recording-reproducing apparatus having the driving mechanism shown in FIG. 13, and the vertical movement of the magnetic tape 68 is controlled by the rotary guides 62, 63, 64, 65.

As described above with reference to FIGS. 12 to 14, when controlling the position of the magnetic tape in the height direction in the conventional rotary head type recording-reproducing apparatus and stationary head type recording-reproducing apparatus, as shown in FIGS. 14A and 14B, the upper edge 51a or lower edge) 51b of the magnetic tape 51 is pressed against the upper flanges or lower flanges provided at the individual rotary guides 47, 48, 49, 50 and receives a reaction force, so that the upper edge 51a or lower edge 51b is compressed. When the force exceeds the static frictional force that the magnetic tape 51 receives from the individual rotary guides 47, 48, 49, 50, the magnetic tape 51 is pushed back down or up, so that the compressive force exerted on the upper edge 51a or lower edge 51b is released.

SUMMARY OF THE INVENTION

The circumferential surfaces of the stationary drum 43, rotary guides 47 to 50, rotary guides 62 to 65, stationary guides 45, 46, and stationary guides 66, 67 used in the driving mechanisms in the rotary head type recording-reproducing apparatus and stationary head type recording-reproducing apparatus shown in FIGS. 12 and 13 are processed by grinding generally or processed by cutting using a lathe. FIG. 15 is a diagrammatic view schematically showing the form of a cross-section of the circumferential surface of the stationary drum 43, and the magnetic tape runs in the vertical direction from the paper surface and is in sliding contact against the circumferential surface of the stationary drum 43. Peak portions 53 are formed so that they individually extend in the circumferential direction of the stationary drum 43 having a substantially cylindrical form, and they are brought into contact with the magnetic tape. In addition, peak portions having the form similar to that of the peak portions in the stationary drum 43 are formed on the circumferential surfaces of the rotary guides 47 to 50, rotary guides 62 to 65, stationary guides 45, 46, and stationary guides 66, 67.

As shown in FIG. 15, the peak portions 53 are formed so as to extend in the circumferential direction of the stationary drum 43 generally having a substantially cylindrical form, and a pitch $a_3$ and a bottom width $a_3'$ of the peak portions 53 are substantially equal. Therefore, as shown in FIG. 16A, when a compressive force $F_2$ that the upper edge 51a or lower edge 51b of the magnetic tape 51 receives from the lead 44, upper flange 47a, and lower flange 49b exceeds a static frictional force $F_1$ from the circumferential surfaces of the stationary drum 43 and rotary guides 47, 49, and thus exceeds a buckling strength $F_3$ of the upper edge 51a or lower edge 51b of the magnetic tape 51 before the magnetic tape 51 starts running, the upper edge 51a or lower edge 51b may suffer buckling to cause an edge damage. The magnetic tape 51 suffers an edge damage and reduces in tape width, so that the lower edge 51b of the magnetic tape 51 leaves the lead 44, thus making it difficult to achieve accurate and stable tracking. Further, the upper edge 51a or lower edge 51b suffering from a damage protrudes to lower the contact between the magnetic tape 51 and the stationary drum 43, causing too large a gap between the magnetic head 42 and the magnetic tape. The gap causes output attenuation with respect to the signals recorded and reproduced on the magnetic tape 51.

Even when the upper edge 51a or lower edge 51b suffers no buckling, the upper edge 51a or lower edge 51b is pressed against the upper flange 47a or lower flange 49b, so that the upper edge 51a or lower edge 51b suffers a damage. Due to the damage caused for this reason, powder generates from the members constituting the magnetic tape 51 to cause a trouble, such as drop out in which signals locally drop. Further, the magnetic tape 51 wears to form wear powder, and the wear powder adheres to the magnetic head 42 to cause too large a gap between the magnetic head 42 and the magnetic tape 51, so that a trouble, such as head clog in which signals attenuate, may occur.

Further, even in the case where the upper edge 51a or lower edge 51b of the magnetic tape 51 suffers no damage, when the upper edge 51a or lower edge 51b is pressed against the upper flange 47a or lower flange 49b to an excessive extent and compressed, the precision of controlling of the position of the upper edge 51a or lower edge 51b is lowered. The lowering of the precision of the position control makes it difficult to achieve accurate tracking of the magnetic tape 51 by the rotary drum 41 and stationary drum 43. Further, even when the leaning of the rotary guides 47 to 50 for guiding the magnetic tape 51 is designed and adjusted with high precision, it is difficult to satisfactorily improve the precision of the position control for the edge. Therefore, as shown in FIG. 16B, it is important to reduce the static frictional force from the stationary drum 43 and rotary guides 47 to 50 and release the compressive force $F_2$ on the magnetic tape 51 before the compressive force $F_2$ exceeds the buckling strength $F_3$. In addition, for the same reason, it is also important to reduce the static frictional force from the stationary guides 45, 46.

The static frictional force $F_1$ can be represented by formula (1) below using a coefficient of static friction μs and a contact load W between the magnetic tape and the sliding portion, and, by lowering the coefficient of static friction μs, the static frictional force $F_1$ can be reduced.

$$F_1 = \mu s \times W \qquad (1)$$

On the other hand, in the stationary guides 45, 46 and rotary drum 41 shown in FIG. 12, when the coefficient of static friction with respect to the magnetic tape 51 increases, a tension to which the magnetic tape 51 is stretched in the forward direction from the rotary drum 41 against the static frictional force between the magnetic tape 51 and the rotary guides 47 to 50 or rotary drum 41 may become large. The tension causes the magnetic tape 51 to adhere to the circumferential surface of the stationary drum 43 or stationary guides 45, 46, so that the magnetic tape 51 may be difficult to smoothly run. Even when the magnetic tape 51 does not adhere to the surface, a stick-slip phenomenon may occur to cause the running of the magnetic tape to be unstable. Similarly, the stationary guides 66, 67 shown in FIG. 13 may increase a tension against the stationary drum 60 to cause stick-slip.

For suppressing the occurrence of an unfavorable phenomenon, such as stick-slip, it is important to reduce the static frictional force between the magnetic tape 51 and the rotary drum 41 or stationary guides 45, 46. That is, it is important to lower the coefficient of static friction of the circumferential surfaces of the rotary drum 41, stationary drum 43, rotary guides 47 to 50, and stationary guides 45, 46 with respect to the magnetic tape 51.

The present invention alleviates the above drawbacks, and provides a magnetic tape apparatus which is advantageous in that the coefficient of static friction between the guide or drum and the magnetic tape is lowered, and a method for producing the apparatus.

The magnetic tape apparatus of the present invention has a sliding portion against which a magnetic tape is in sliding contact, wherein the sliding portion has at least one flat portion formed by cutting a circumferential surface of the sliding portion so that the flat portion is substantially parallel to a sliding contact surface of the magnetic tape, and has a plurality of peak portions formed by cutting so that the peak portions protrude from the flat portion at a predetermined pitch. The present inventor has found that the coefficient of static friction of the circumferential surface of the sliding portion depends on the total area of the meniscuses formed between the magnetic tape and the sliding portion. Therefore, a flat portion is formed between the peak portions formed on the circumferential surface of the sliding portion to reduce the total area of the meniscuses, making it possible to lower the coefficient of static friction of the circumferential surface of the sliding portion against which the magnetic tape is in sliding contact.

Further, in the magnetic tape apparatus, under conditions such that a surface roughness defined as an Rmax, which is a maximum height of the peak portion, falls in the range from 0.5 to 2.0 μm, the width of the flat portion may have an upper limit of 230 μm and a lower limit within the range defined by a line formed by connecting points (0.5, 50), (1.0, 20), (1.5, 15), and (2.0, 10), the first coordinate of the point being the surface roughness (μm), and the second coordinate being the width (μm) of the flat portion. When the width of the flat portion falls in the above range, the coefficient of static friction can be lowered satisfactorily, so that the size precision of the sliding portion, e.g., stationary drum can be improved to a level free of a practical problem while suppressing the occurrence of tracking error.

In addition, in the magnetic tape apparatus of the present invention, the sliding portion may be a drum including a magnetic head for recording and/or reproducing information on the magnetic tape. By virtue of the drum, the damage of edge of the magnetic tape and the occurrence of tracking error can be suppressed.

Further, in the magnetic tape apparatus of the present invention, the sliding portion may be a guide for guiding the magnetic tape. By virtue of the guide, not only can the magnetic tape be prevented from suffering an edge damage, but also the tension in the magnetic tape can be lowered.

Further, in the magnetic tape apparatus, the drum may includes a rotary drum having the magnetic head and being capable of rotating, and a stationary drum supporting the rotary drum with a shaft and being fixed, wherein the flat portion and the peak portions are formed so that they extend in the circumferential direction of the rotary drum and are substantially parallel to a lead portion, formed in the stationary drum, for guiding the magnetic tape. When the magnetic tape slid against the circumferential surface on which the flat portions and peak portions are formed is guided by the lead portion, the magnetic tape can stably run.

Further, in the magnetic tape apparatus, the circumferential surface of the stationary drum processed by cutting may have a surface roughness of 1 to 2 μm. When the processed surface of the stationary drum has a surface roughness in this range, not only can the precision of running of the magnetic tape be improved, but also the coefficient of static friction of the processed surface can be lowered.

In addition, in the magnetic tape apparatus of the present invention, the circumferential surface of the guide processed by cutting may have a surface roughness of 0.1 to 10 μm. When the processed surface of the guide has a surface roughness in this range, not only can the precision of running of the magnetic tape be improved, but also the coefficient of static friction of the processed surface can be lowered.

The method of the present invention is a method for producing a magnetic tape apparatus including a sliding portion against which a magnetic tape is in sliding contact, wherein the method includes the steps of: forming at least one flat portion by cutting a circumferential surface of the sliding portion so that the flat portion is substantially parallel to a sliding contact surface of the magnetic tape; and forming a plurality of peak portions by cutting so that the peak portions protrude from the flat portion at a predetermined pitch. By the method for producing a magnetic tape apparatus of the present invention, peak portions and flat portions can be formed to lower the coefficient of static friction of the circumferential surface of the sliding portion, thus making it possible to produce a magnetic tape apparatus which can suppress a trouble, such as tracking error.

By the magnetic tape apparatus of the present invention, a flat portion is formed between the peak portions formed on the circumferential surface to reduce the total area of the meniscuses formed between the magnetic tape and the circumferential surface of the stationary drum, rotary guide, or stationary guide against which the magnetic tape is in sliding contact, making it possible to lower the coefficient of static friction between the stationary drum, rotary guide, or stationary guide and the magnetic tape. The lowering of the coefficient of static friction can prevent tracking error, unstable running of the magnetic tape, and damage of the edge of the magnetic tape, which are likely to occur as the track is narrowed, the wavelength is shorter, and the magnetic tape becomes thinner.

Further, the coefficient of static friction can be lowered without increasing the surface roughness of the stationary drum, rotary guide, and stationary guide. Therefore, there can be provided a magnetic tape recording-reproducing apparatus which exhibits high S/N ratio for the reproducing signals while suppressing the formation of a space between the stationary drum, rotary guide, or stationary guide and the magnetic tape.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIGS. 7A and 7B are enlarged cross-sectional views of the circumferential surfaces of samples measured with respect to the coefficient of static friction, wherein FIG. 7A is an enlarged cross-sectional view showing a conventional form of the cross-section, and FIG. 7B is an enlarged cross-sectional view of the circumferential surface on which peak portions and flat portions are formed;

FIGS. 8A to 8C are explanatory views showing how to measure a coefficient of static friction, wherein FIG. 8A is a view showing the configuration of an apparatus for measuring a coefficient of static friction, FIG. 8B is an enlarged view of a sample against which a tape is in sliding contact and the vicinity of the sample, and FIG. 8C is a diagram showing one example of a change of a tension value against a strain gauge moving distance;

FIGS. 9A and 9B are characteristic diagrams for coefficient of static friction against surface roughness, wherein FIG. 9A is a characteristic diagram for coefficient of static friction μs measured when the pitch $a_1$ and the bottom width $a_1'$ are substantially equal as shown in FIG. 7A, and FIG. 9B is a characteristic diagram for coefficient of static friction μs measured when the flat portions 23 are formed between the peak portions 22 as shown in FIG. 7B;

FIGS. 14A and 14B are explanatory views illustrating controlling of the position of a magnetic tape in conventional rotary head type recording-reproducing apparatus and stationary head type recording-reproducing apparatus, wherein FIG. 14A is a view showing controlling of the upper edge, and FIG. 14B is a view showing controlling of the lower edge;

FIGS. 16A and 16B are graphs showing the relationship between static frictional force and compressive force exerted on a magnetic tape and a buckling strength of the magnetic tape, wherein FIG. 16A is a graph showing the conventional relationship, and FIG. 16B is a graph showing the relationship in the magnetic tape apparatus of the present invention.

DESCRIPTION OF THE PREFERRED EMBODIMENTS

Figure 12:
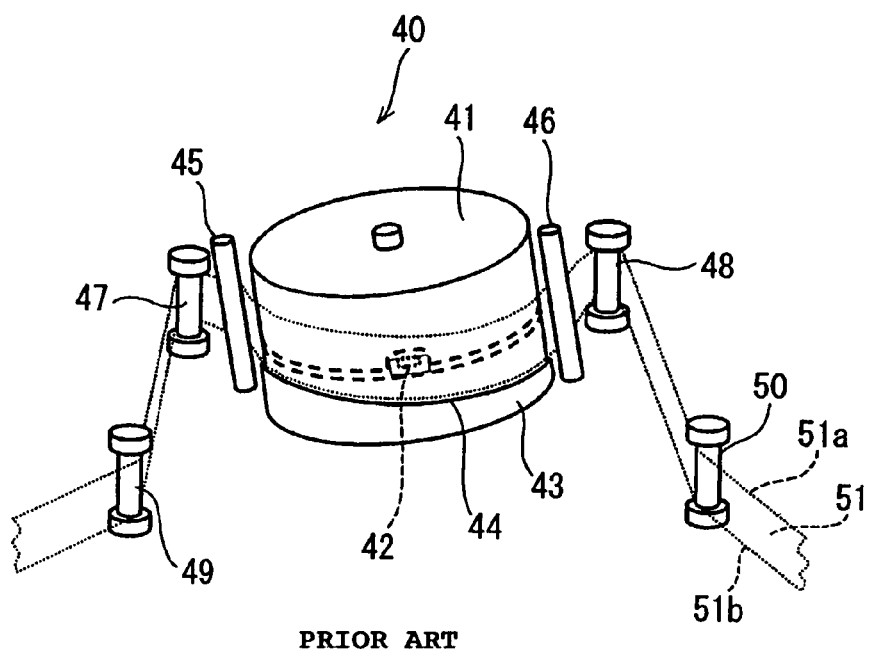
FIG. 12 is a view showing the construction of a driving mechanism for magnetic tape in a conventional rotary head type recording-reproducing apparatus.
Figure 13:
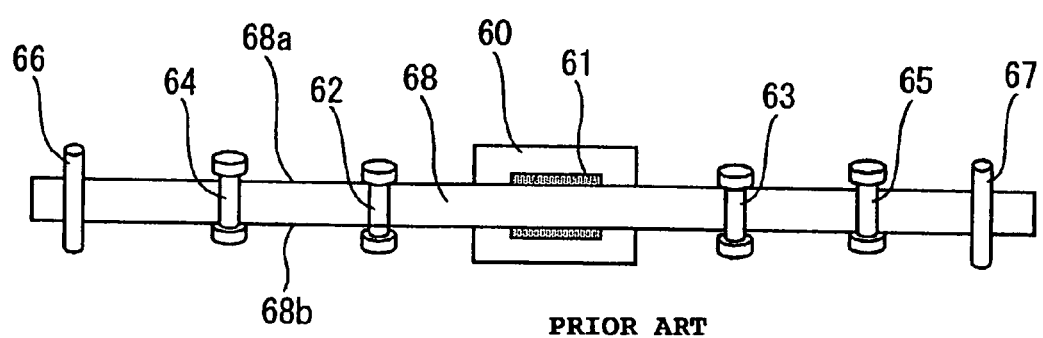
FIG. 13 is a view showing the construction of a driving mechanism for magnetic tape in a conventional stationary head type recording-reproducing apparatus.
Figure 14A:
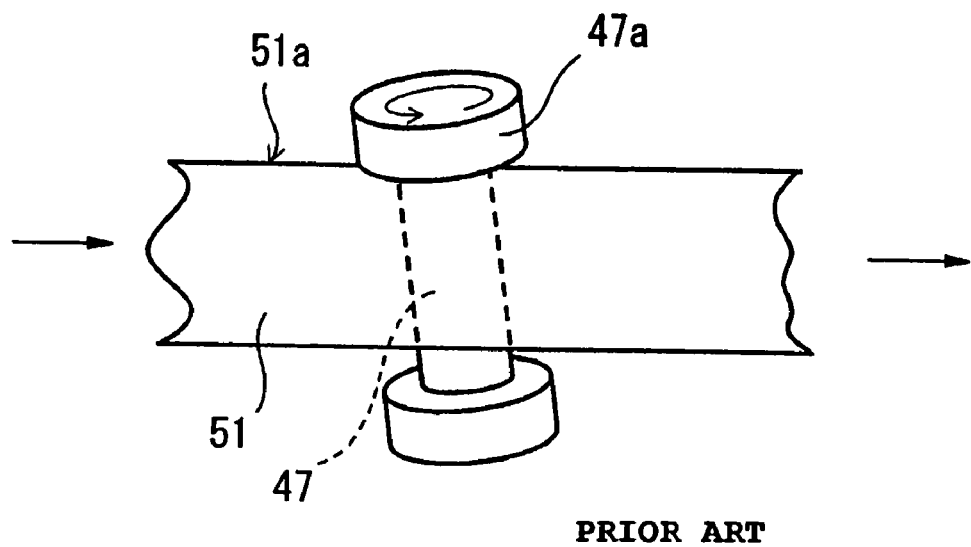
Figure 14B:
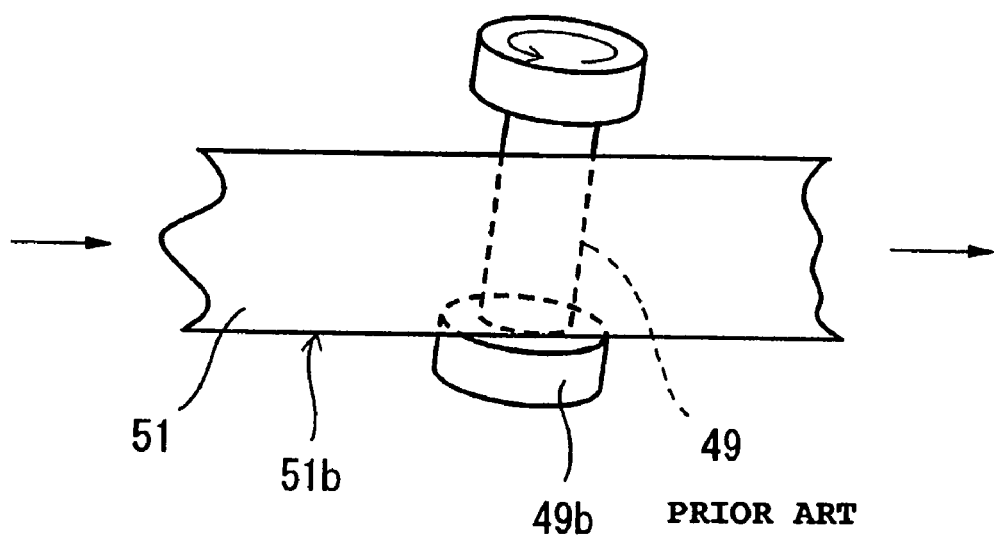
Figure 15:
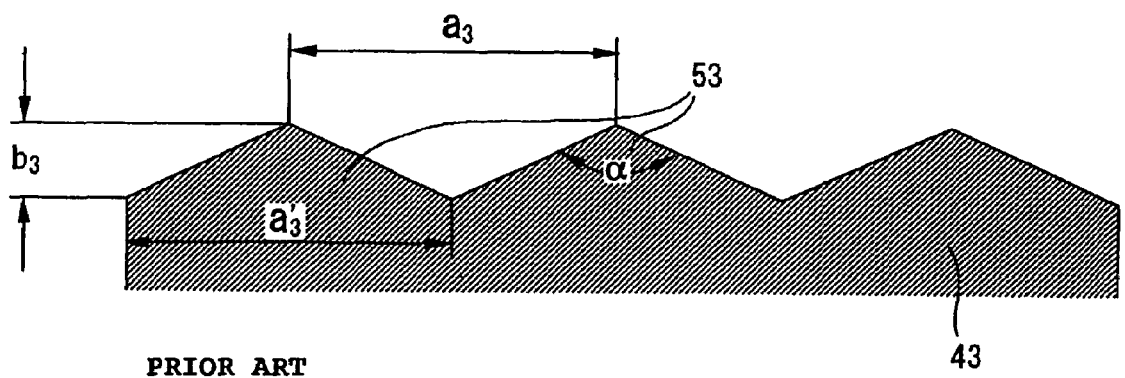
FIG. 15 is a diagrammatic cross-sectional view schematically showing the form of a cross-section of the circumferential surface of a stationary drum in a conventional rotary head type recording-reproducing apparatus.
Figure 16A:
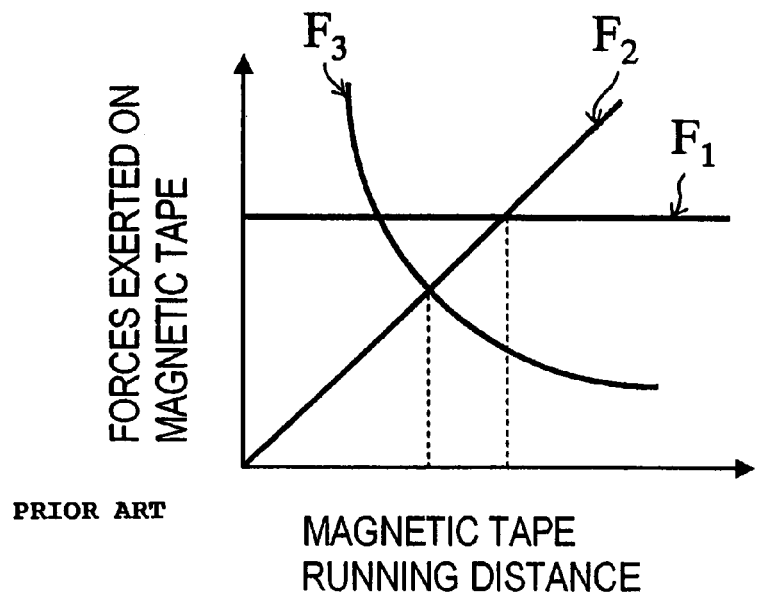
Figure 16B:
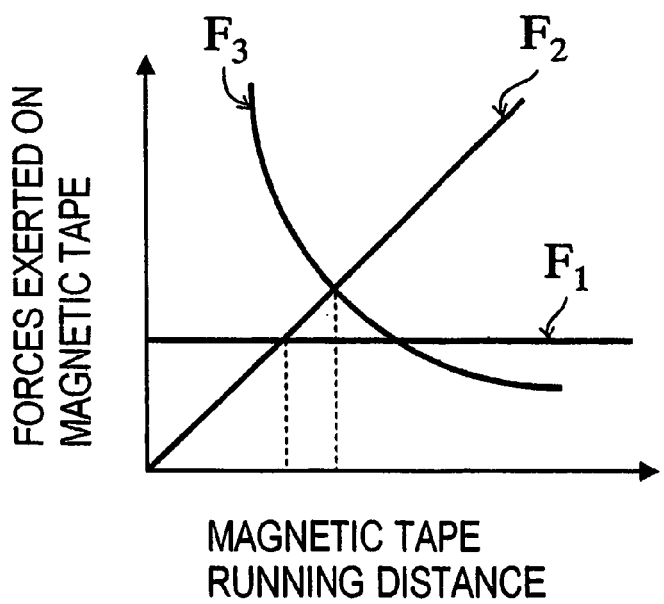

Hereinbelow, a magnetic tape apparatus of the present invention will be described with reference to the drawings. The magnetic tape apparatus of the present invention has substantially the same driving mechanism as those in the conventional rotary head type recording-reproducing apparatus and stationary head type recording-reproducing apparatus described above with reference to FIGS. 12 and 13, and has a characteristic feature in a sliding portion against which the running magnetic tape is in sliding contact, for example, a drum or a guide. In the present embodiment, a rotary head type recording-reproducing apparatus is described as an example, but the magnetic tape apparatus of the present invention is an apparatus which can be advantageously used as an apparatus having any driving mechanism as long as the apparatus achieves recording and/or reproducing while sliding a running magnetic tape against a predetermined sliding portion.

Figure 1:
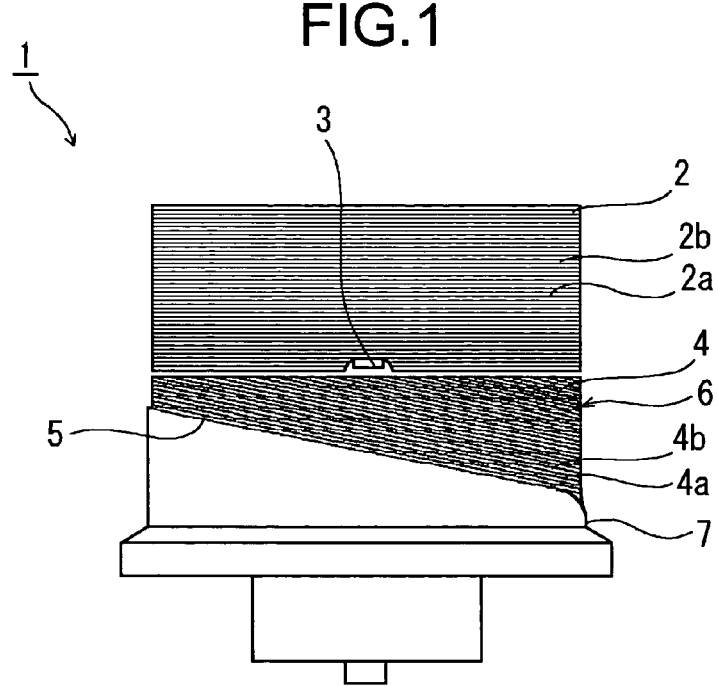
FIG. 1 is a diagrammatic view showing the structure of a drum portion used in a rotary head type recording-reproducing apparatus which is one example of a magnetic tape apparatus of the present invention, as viewed from the side of the apparatus.
Figure 2:
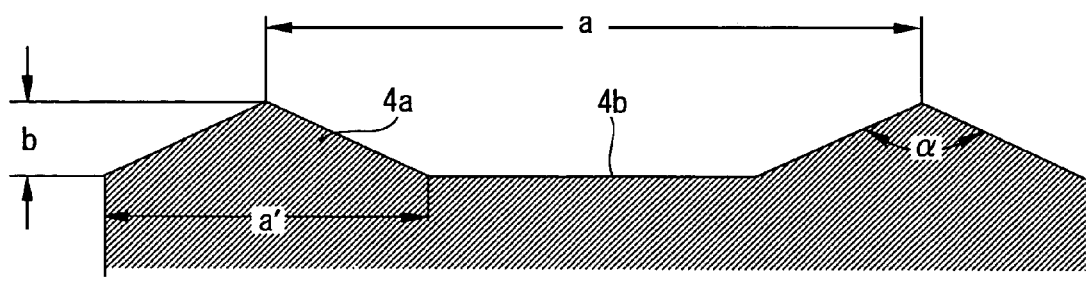
FIG. 2 is an enlarged cross-sectional view of a portion around the circumferential surface of a stationary drum.

A drum portion in the rotary head type recording-reproducing apparatus according to the present embodiment is described with reference to FIGS. 1 and 2. FIG. 1 is a diagrammatic view showing the structure of a drum portion 1 used in the rotary head type recording-reproducing apparatus, as viewed from the side of the apparatus, and FIG. 2 is an enlarged cross-sectional view of the circumferential surface of a stationary drum 4.

As shown in FIG. 1, the drum portion 1 includes a rotary drum 2 having a magnetic head 3, and the stationary drum 4 for supporting the rotary drum 2 with a shaft.

The rotary drum 2 has a substantially cylindrical form, and a peak portion 2a and a flat portion 2b are formed by cutting on the circumferential surface of the rotary drum 2. The magnetic head 3 is disposed so as to face the circumferential surface of the rotary drum 2, and records and reproduces information on the magnetic tape which runs while being slid against the circumferential surfaces of the rotary drum 2 and stationary drum 4.

The stationary drum 4 has a lead 5 for preventing the running magnetic tape from going out of the appropriate position. The lead 5 is formed at an oblique angle to the rotary shaft of the rotary drum 2, and the magnetic tape runs along the lead 5. For preventing the lower edge of the magnetic tape from suffering a damage, an end portion 7 on the side of the outlet for the magnetic tape which runs along the lead 5 is processed so as to escape downward with respect to the running direction of the magnetic tape. The circumferential surface 6 of the stationary drum 4 is processed by cutting to form peak portions 4a and a flat portion 4b so that they extend in the circumferential direction of the stationary drum. In addition, the peak portions 4a and flat portion 4b are formed so that they extend in substantially parallel to the lead 5.

As shown in FIG. 2, the peak portions 4a are formed so as to be separated by the flat portion 4b. The peak portions 4a and flat portion 4b are formed so that the relationship: a' <a is satisfied, where "a" represents a distance between the ridges of the peak portions 4a, i.e., pitch of the peak portions 4a, and "a'" represents a bottom width of the peak portions 4a. A plurality of the peak portions 4a and flat portions 4b are alternately formed in the direction of the shaft of the stationary drum 4. When the flat portion 4b is formed between the peak portions 4a and the pitch a of the peak portions 4a is larger than the bottom width a' of the peak portions 4a as mentioned above, the number of the peak portions 4a per unit area on the circumferential surface 6 can be reduced without increasing an angle $\alpha$ of apex portions of the peak portions 4a. Thus, the total area of the meniscuses formed when the magnetic tape is in sliding contact against the circumferential surface 6 can be reduced. Therefore, the coefficient of static friction of the circumferential surface 6 of the stationary drum 4 can be lowered to prevent the edge of the magnetic tape from suffering a damage and improve the stability of tracking, as compared to the case where the peak portions 4a are formed at a predetermined pitch without forming the flat portion 4b. Further, formation of too large a gap between the magnetic tape and the stationary drum 4 can be suppressed, thus preventing the occurrence of a trouble, such as signal attenuation. In this example, the peak portions 4a and flat portions 4b formed on the circumferential surface 6 of the stationary drum 4 are described. However, when peak portions and flat portions similar to the peak portions 4a and flat portions 4b formed on the circumferential surface 6 of the stationary drum 4 are formed on the circumferential surface of the stationary guide or rotary guide for guiding the magnetic tape, the coefficient of static friction of the sliding portion, i.e., stationary guide or rotary guide can be similarly lowered, thus making it possible to suppress the occurrence of an unfavorable phenomenon, such as stick-slip. The flat portion 4b may be further cut to curve downwards as viewed in the figures (see e.g. FIGS. 4 and 6) as long as the flat portion 4b is formed between the peak portions 4a.

The stationary drum 4 can be formed using an aluminum alloy and an organic polymer material. The stationary guide and rotary guide can be formed using stainless steel, an aluminum alloy, a ceramic material, or an organic polymer material. The circumferential surface of the stationary drum 4, stationary guide, or rotary guide may be coated with ceramic or a metal. When coating the circumferential surface of the stationary drum, stationary guide, or rotary guide with an organic polymer material or a ceramic material as a base material, fibrous metal, organic polymer material, or ceramic can be incorporated into the base material. When the sliding portion, e.g., stationary drum 4, stationary guide, or rotary guide is formed using the above material, peak portions separated by a flat portion can be formed with high precision by cutting the sliding portion under desired cutting conditions.

Next, one example of a method for forming the peak portions 4a and flat portions 4b shown in FIG. 2 by cutting will be described with reference to FIGS. 3 and 4.

Figure 3:
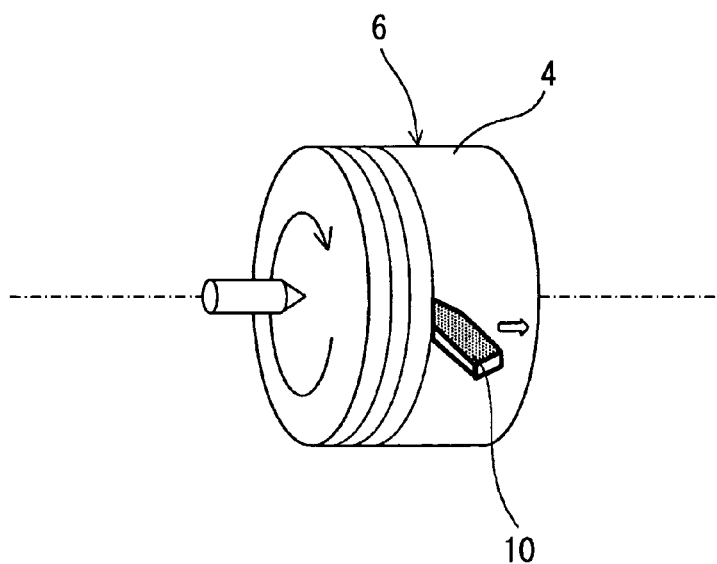
FIG. 3 is an explanatory view illustrating a method for cutting a stationary drum.

As shown in FIG. 3, the stationary drum 4 to be cut is fixed to a rotary support portion provided in a lathe, and, while rotating the stationary drum, together with the rotary support portion, a cutting tool 10 is pressed against the circumferential surface of the stationary drum to cut it. Further, while moving the cutting tool 10 along the circumferential surface 6 of the stationary drum 4 in the direction of the rotary shaft of the stationary drum, the circumferential surface is cut into a spiral form to form the peak portions 4a and flat portions 4b.

Figure 4:
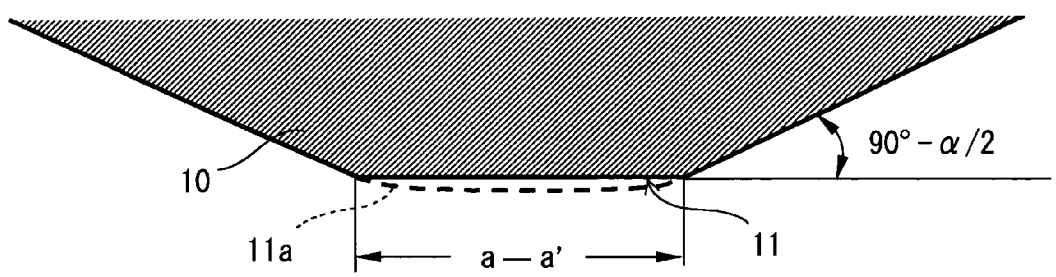
FIG. 4 is a diagrammatic cross-sectional view of an essential portion of the tip of a cutting tool used for cutting the circumferential surface of a stationary drum.

As shown in FIG. 4, a tip portion 11 of the cutting tool 10 is formed so as to have a substantially flat surface having a width which is substantially equal to the difference (a-a') between the pitch a of the peak portions 4a and the bottom width a' of the peak portions 4a. The width of the tip portion 11 is not restricted by the width of the flat portions 4b in this example, and it can be a desired width by selecting the cutting conditions, e.g., the pressing force of the cutting tool and the speed of moving the cutting tool in the direction of the shaft of the stationary drum during the cutting so that predetermined peak portions and flat portions can be formed. For example, a cutting tool having the tip portion 11 curving downwards in the figure as indicated by a dotted line 11a can be used. Further, an angle between a straight line extending from the tip portion 11 in the lateral direction in the figure and the sidewall of the cutting tool 10 can be set based on the angle $\alpha$ of the apex portions of the peak portions 4a, for example, $90°-\alpha/2$.

Figure 5:
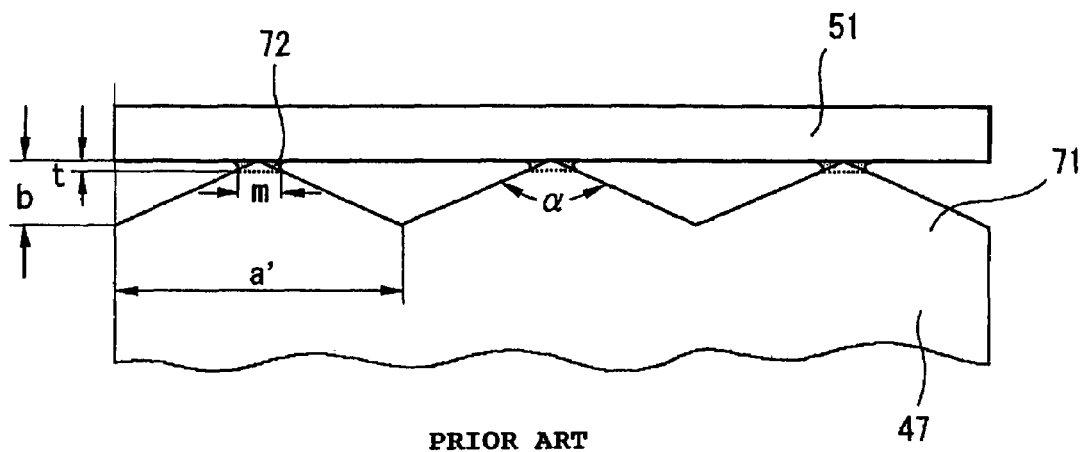
FIG. 5 is an explanatory view illustrating the relationship between a meniscus, which is formed between a magnetic tape and the surface against which the magnetic tape is in sliding contact, and a coefficient of static friction.

Here, the present invention is described with reference to FIG. 5. Moisture in air adsorbs onto a portion between the sliding portion, e.g., a guide or drum and the magnetic tape to form a meniscus, increasing the coefficient of static friction of the circumferential surface of the guide or drum. As shown in FIG. 5, moisture in air forms meniscuses 72, such as adsorbing water film, between a magnetic tape 51 and peak portions 71 formed on the circumferential surface of a rotary guide 47. As shown in FIG. 5, the peak portions 71 on the circumferential surface of the rotary guide 47 are formed so as to extend in the vertical direction from the paper surface. When the length of each meniscus 72 is taken as "m" and a unit length is considered in the vertical direction from the paper surface, the value of the length m of the meniscus 72 can be considered as a meniscus area m, and a product of the meniscus area m per one peak portion 71 and the number of the peak portions 71 per unit area corresponds to the total area A of the meniscuses per unit area. Specifically, the total area A of the meniscuses per unit area can be represented by formula (2) below. In the formula (2) below, A represents the total area of the meniscuses per unit area, m represents the meniscus area per one peak portion, n represents the number of the peak portions 71 per unit area, a represents the pitch of the peak portions 71, t represents the thickness of the meniscuses 72, b represents the surface roughness of the circumferential surface of the rotary guide 47, and a represents the angle of the apex portions of the peak portions 71, and the meniscus area m and the number n of the peak portions 71 per unit area can be represented by, respectively, formula (3) and formula (4) below. For reducing the total area A of the meniscuses, lowering of the number n of the peak portions 71 per unit area can be thought. However, when the bottom width a' of the peak portions 71 is increased to lower the number n of the peak portions 71 per unit area, the angle $\alpha$ of the apex portions of the peak portions 71 becomes large, so that the meniscus area m per one peak portion 71 is disadvantageously increased. Therefore, even through the number n of the peak portions per unit area is lowered, the total area A of the meniscuses is difficult to be reduced, thus making it difficult to satisfactorily lower the coefficient of static friction.

$$A = m \times n = a \times (t/b) \times (1/a) = t/b \qquad (2)$$

$$m = a \times t/b \qquad (3)$$

$$n = 1/a \qquad (4)$$

The smaller the total area A of the meniscuses, the lower the coefficient of static friction. Therefore, for lowering the static frictional force on the sliding contact surface of the running magnetic tape being slid against the drum or guide, it is important that the angle $\alpha$ of the apex portions of the peak portions 71 is reduced and the number n of the peak portions 71 per unit area is reduced to lower the total area A of the meniscuses.

Figure 6:
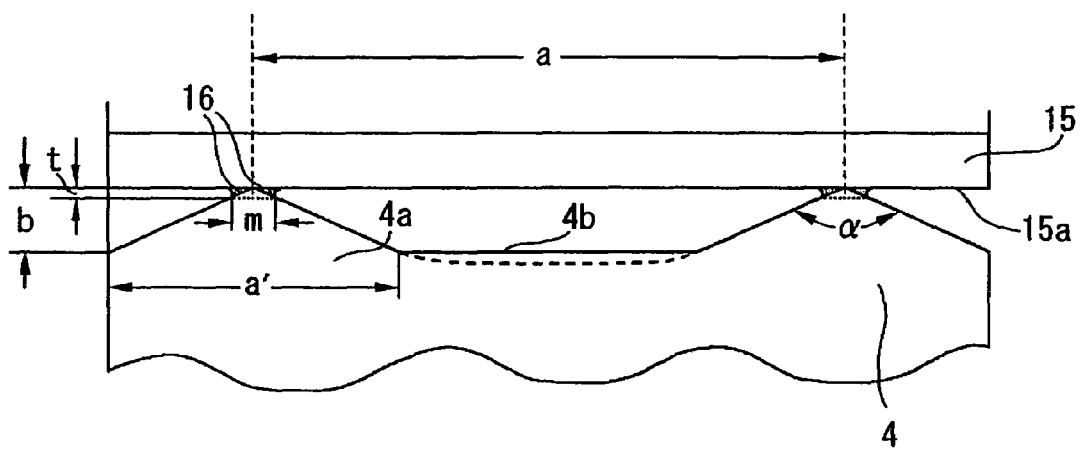
FIG. 6 is an explanatory view showing a state such that a magnetic tape is in sliding contact against the circumferential surface of a stationary drum.

Next, the peak portions 4a and flat portions 4b formed on the circumferential surface 6 of the stationary drum 4 are described in more detail with reference to FIG. 6. FIG. 6 is a view showing a state such that a magnetic tape 15 runs so as to be slid against the ridges of the peak portions 4a. The magnetic tape 15 runs in the vertical direction from the paper surface of FIG. 6, and only a unit length of the magnetic tape 15 in the lateral direction in the figure is shown.

Meniscuses 16 are formed between the peak portions 4a and the magnetic tape 15 slid against the ridges of the peak portions 4a. In the figure, the thickness of meniscuses 16 is taken as "t", the height of the peak portions 4a is taken as "b", the pitch is taken as "a", and the bottom width is taken as "a'". In FIG. 6, the meniscuses 16 are adsorbing water film formed from moisture in air which adsorbs onto the magnetic tape, and the meniscuses 16 may be formed from a lubricant applied to the surface of the magnetic tape 15.

The pitch a is larger than the bottom width a', and, with respect to the angle $\alpha$ of the apex portions of the peak portions 4a, there is no particular limitation in this example, but it is desired that the angle $\alpha$ is smaller, and the lowering of the angle $\alpha$ enables reduction of the area of the meniscus 16 per one peak portion 4a.

The flat portion 4b is formed, as indicated by a solid line shown in the figure, so as to be substantially parallel to a sliding contact surface 15a of the magnetic tape 15 brought into contact with the peak portions 4a, and it may be formed in a concave form which curves inwards as indicated by a broken line shown in the figure. Specifically, the flat portion 4b may be formed between the peak portions 4a so that the pitch a can be widened while keeping the angle $\alpha$ substantially constant, as compared to the case where the peak portions 4a and flat portion 4b are formed so that the pitch a and the bottom width a' have substantially the equal length. The coefficient of static friction of the circumferential surface 6 of the stationary drum 4 is determined by the total area A of the meniscuses corresponding to a product of the meniscus area per one peak portion 4a and the number of the peak portions 4a per unit area seen in the formula (2) above. Thus, the number of the peak portions 4a per unit area can be reduced, without increasing the meniscus area per one peak portion 4a formed on the circumferential surface 6 of the stationary drum 4 on which the flat portion 4b is formed between the peak portions 4a, to lower the total area A of the meniscuses. Therefore, the coefficient of static friction due to the adsorbing water or lubricant can be reduced, making it possible to lower the static frictional force between the magnetic tape 15 and the stationary drum 4.

Alternatively, the meniscus area per one peak portion 4a can be reduced by, while keeping constant the bottom width a' of the peak portions 4a, increasing the height b of the peak portions 4a, i.e., value of the surface roughness to reduce the angle $\alpha$. However, the increase of the surface roughness may lower the precision of processing for the circumferential surface 6, causing a problem of the running properties of the magnetic tape 15. Therefore, it is important that a satisfactory precision of processing for the circumferential surface 6 of the stationary drum 4 is secured without increasing the surface roughness of the circumferential surface 6 and that the total area A of the meniscuses is reduced. In the stationary drum 4 in this example, it is desired that the peak portions 4a and flat portion 4b are formed and that the surface roughness is 1 to 2 µm. The surface roughness is a surface roughness defined as a maximum height (Rmax) of the peak portions 4a.

Like in the stationary drum 4, for securing a satisfactory precision of processing for the stationary guide or rotary guide, it is desired that the surface roughness of the circumferential surface of the stationary guide or rotary guide falls in the range from 0.1 to 10 µm.

The magnetic tape 15 used in the rotary head type recording-reproducing apparatus in this example includes a sheet-form base member, and a magnetic film formed as a recording layer on one surface of the sheet member, and the base member has a thickness of, for example, 2 to 15 µm. A back coat layer may be formed on the back surface of the sheet member.

With respect to any magnetic tape which runs using the stationary drum 4 on which the peak portions 4a and flat portions 4b are formed and using the stationary guide and rotary drum each having a circumferential surface on which the peak portions and flat portions are formed, the coefficient of static friction of the magnetic tape can be lowered irrespective of the materials for or structure of the magnetic tape. For example, in a coating type tape having a recording layer formed by applying a binder containing a magnetic material to a base film, the coefficient of static friction during the running of the tape can be lowered. In the coating type tape, the binder is considered to be the cause of a trouble, such as head clog in which the coating type tape does not run smoothly, and thus the lowering of the coefficient of static friction can suppress the occurrence of head clog in the coating type tape. Further, in a deposited tape having a magnetic material deposited on a base film, the coefficient of static friction of the deposited tape during the running can be lowered. In addition, also when a protective film, such as a carbon film, is formed on the recording layer of the deposited tape, the coefficient of static friction can be lowered.

In FIG. 6, the surface of the magnetic tape 15 on which the magnetic film is formed is in sliding contact against the peak portions 4a, but, both when the surface of the magnetic tape 15 on which the magnetic film is formed is in sliding contact against the circumferential surface of the rotary guide or stationary guide and when the back coat layer of the magnetic tape 15 is in sliding contact against the rotary guide or stationary guide, the coefficient of static friction can be lowered. In other words, by forming the peak portions and flat portions on the circumferential surface as described in this example, the coefficient of static friction of the circumferential surface of the sliding portion, i.e., stationary drum, rotary guide, or stationary guide can be lowered irrespective of the materials for or structure of the tape slid against the surface.

EXAMPLE 1

Next, the results of the measurement of coefficient of static friction with respect to the samples each having a circumferential surface on which peak portions and flat portions are formed are described with reference to FIGS. 7 to 9. The samples have a substantially cylindrical form, and the values of the coefficient of static friction of the circumferential surface were compared between the samples, which has the circumferential surface on which peak portions and flat portions preferred in the magnetic tape apparatus of the present invention are formed, and the samples, which has a conventional form of the circumferential surface.

Figure 7A:
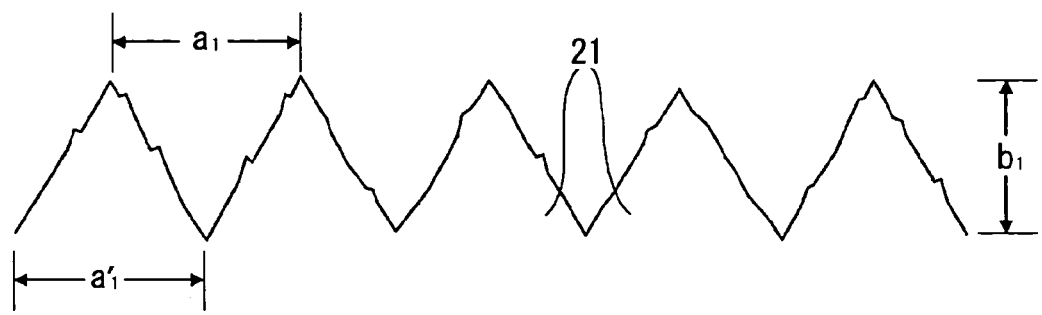
Figure 7B:
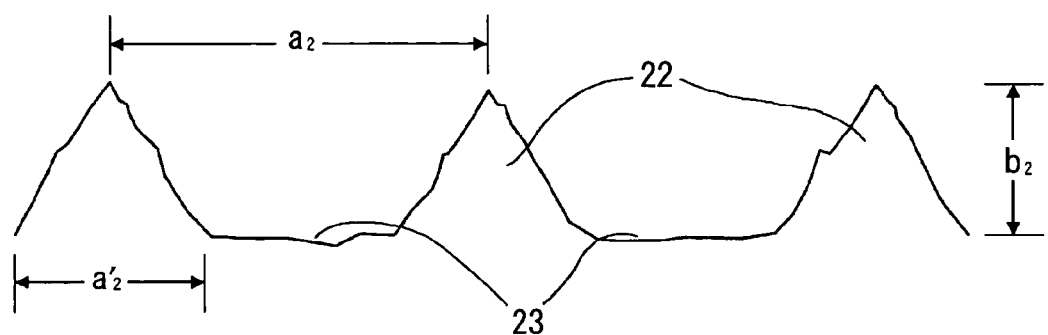

FIGS. 7A and 7B are enlarged cross-sectional views of the circumferential surfaces of samples to be measured with respect to the coefficient of static friction, schematically showing the cross-section tracing an image obtained by actually examining the cross-section of the circumferential surface. FIG. 7A is an enlarged cross-sectional view showing a conventional form of the cross-section, and a pitch $a_1$ of peak portions 21 formed on the circumferential surface of the sample and a bottom width $a_1'$ of the peak portions 21 are substantially equal and individually approximately 50 µm, and a height $b_1$ of the peak portions is approximately 2 µm.

FIG. 7B is an enlarged cross-sectional view showing a form of the cross-section of the circumferential surface of a sample on which flat portions 23 are formed individually between peak portions 22. The peak portions 22 and flat portions 23 are formed by cutting so that a pitch $a_2$ of the peak portions 22 is approximately 100 µm and a bottom width $a_2'$ of the peak portions 22 is approximately 50 µm. A height $b_2$ of the peak portions is approximately 2 µm similar to the height $b_1$ of the peak portions 21 shown in FIG. 7A.

In FIGS. 7A and 7B, it should be noted that the reduction ration in the vertical direction and in the horizontal direction in the figure are different, and the images obtained by observing the samples were traced by changing the magnifications in the vertical and horizontal directions so that the heights $b_1$, $b_2$ of the peak portions 21, 22 were emphasized with respect to the respective pitches of the peak portions 21, 22. The pitch $a_2$ and bottom width $a_2'$ shown in FIG. 7B are one example, and, in the below-mentioned measurement of coefficient of static friction, a coefficient of static friction was measured with respect to the samples in which only the pitch $a_2$, i.e., the width of the flat portions 23 was changed. Further, the height of the peak portions 21, 22 shown in FIGS. 7A and 7B, i.e., the surface roughness was changed to measure a coefficient of static friction.

Figure 8A:
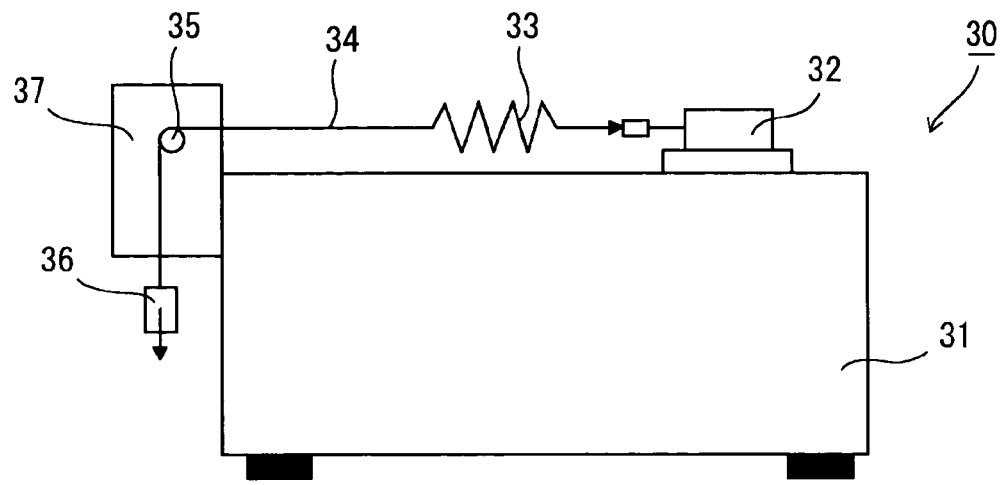
Figure 8B:
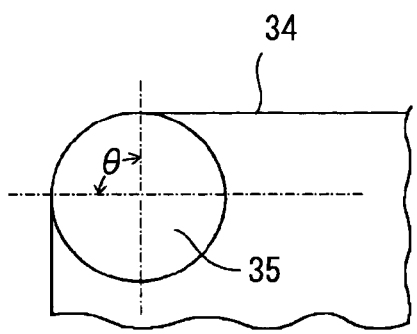
Figure 8C:
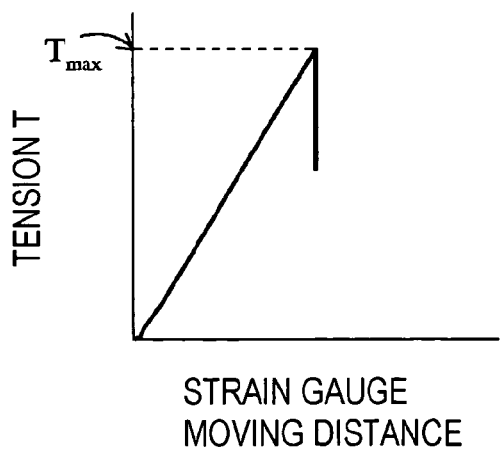

Next, one example of a method for measuring a coefficient of static friction is described with reference to FIGS. 8A to 8C. FIGS. 8A to 8C are explanatory views showing how to measure a coefficient of static friction, wherein FIG. 8A is a view showing the construction of an apparatus for measuring a coefficient of static friction, FIG. 8B is an enlarged view of a sample positioned in the apparatus shown in FIG. 8A and the vicinity of the sample, and FIG. 8C is one example of a graph schematically showing a tension value against a strain gauge moving distance.

A static friction coefficient measurement apparatus 30 shown in FIG. 8A is a measurement apparatus generally used for measuring a coefficient of static friction of a sample 35, and has a strain gauge 32, an extension spring 33, a sample supporting portion 37, and a pedestal portion 31 having mounted thereon and supporting them. As shown in FIGS. 8A and 8B, θ is an angle of winding a tape 34 around a sample 35. The sample 35 to be measured is supported by the sample supporting portion 37, and a measurement is conducted in a state such that a tape 34 is disposed so as to be in contact with the circumferential surface of the sample 35. The tape 34 is wound round the circumferential surface of the sample 35 having a substantially cylindrical form in a state such that one end of the tape 34 is connected to the extension spring 33, and a weight 36 is connected to another end of the tape 34. Further, the strain gauge 32 is extended in the opposite direction to the tape 34, i.e., direction of the right-hand side in the figure, and a maximum value $T_{max}$ of a tension T of the extension spring 33 shown in FIG. 8C is applied to formula (5) below to determine a coefficient of static friction μs. N represents a load of the weight.

$$\mu s = (1/\theta) \times \ln(T_{max}/N) \quad (5)$$

Figure 9A:
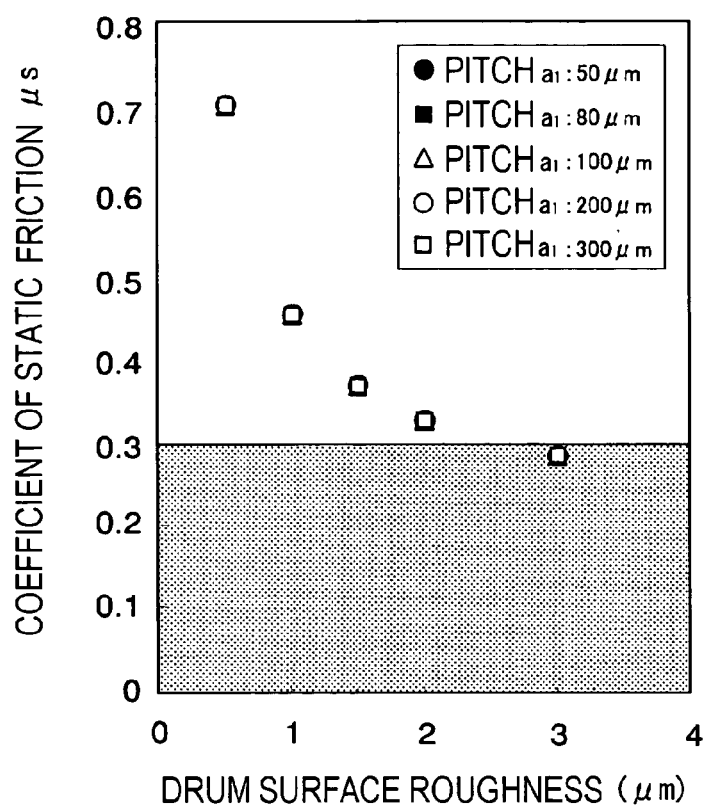
Figure 9B:
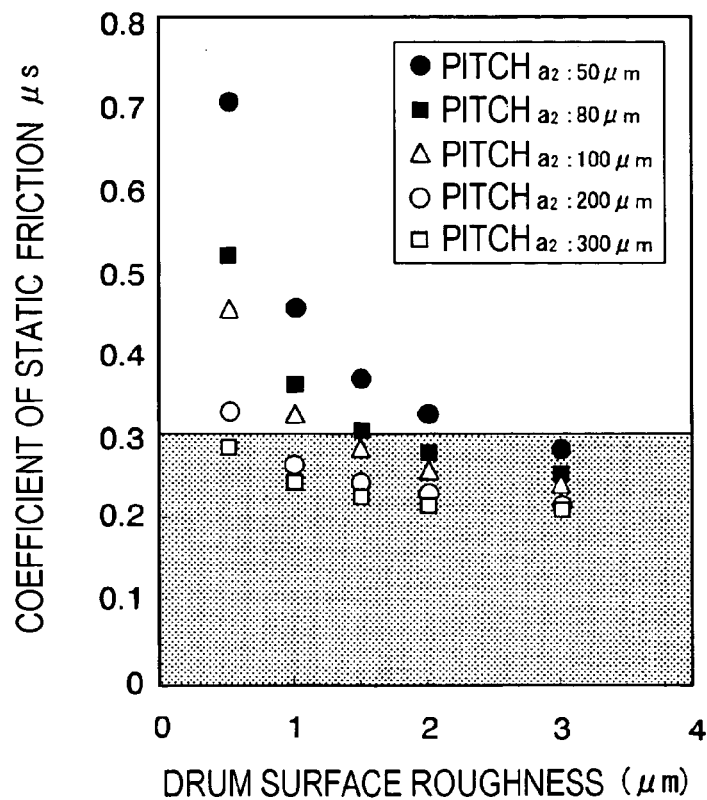

FIGS. 9A and 9B are characteristic diagrams on which values of coefficient of static friction μs are plotted against the surface roughness of the circumferential surface of the sample 35 using the pitch of the peak portions formed on the circumferential surface of the sample 35 as a parameter, wherein FIG. 9A is a characteristic diagram for the coefficient of static friction μs measured when the peak portions 21 are formed on the circumferential surface of the sample 35 so that the pitch $a_1$ and the bottom width $a_1'$ are substantially equal as shown in FIG. 7A, and FIG. 9B is a characteristic diagram for the coefficient of static friction μs measured when the flat portions are formed between the peak portions as shown in FIG. 7B. The measurement values of coefficient of static friction shown in FIGS. 9A and 9B are values measured by the method for measurement of coefficient of static friction described above with reference to FIGS. 8A to 8C. In addition, an environment for the measurement of the coefficient of static friction plotted on FIGS. 9A and 9B is such that the temperature is 40° C. and the humidity is 80%. In the measurement of the coefficient of static friction, as the tape 34 to be slid against the circumferential surface of the sample 35, a deposition tape was used, and the magnetic surface of the tape having a magnetic material deposited thereon was slid against the circumferential surface of the sample 35. On the magnetic surface of the deposition tape, a carbon protective film having a thickness of 10 nm is formed, and further a lubricant is applied to the carbon film so that its thickness becomes 5 nm. The circumferential surface of the sample 35 has a surface roughness of 2 μm.

As shown in FIG. 9A, in the case where no flat portion is formed between the peak portions 21 on the circumferential surface of the sample 35, when the pitch $a_1$ is changed from 50 to 300 μm under conditions such that the surface roughness falls in the range from 0.5 to 3 μm, almost no change is found in the coefficient of static friction μs. That is, it is presumed that the increase of the pitch $a_1$ of the peak portions 21 causes the angle α of the apex portions of the peak portions 21 to be larger, so that the total area of the meniscuses formed between the deposition tape as the tape 34 and the ridges of the peak portions 21 is substantially equal even under different conditions.

On the other hand, in the rotary head type recording-reproducing apparatus according to the present embodiment, for preventing the occurrence of tracking error, the value of coefficient of static friction of the stationary drum 4 falls in the range for conditions corresponding to the shaded regions shown in FIGS. 9A and 9B, namely, the coefficient of static friction is 0.3 or less under conditions such that the surface roughness of the circumferential surface 6 of the stationary drum 4 falls in the range of 4 μm or less. In a stationary drum having a circumferential surface on which peak portions similar to the peak portions 21 shown in FIG. 7A are formed, when the surface roughness of the stationary drum is 3 μm or more, no tracking error occurs, but the stationary drum having too large a surface roughness disadvantageously makes it difficult to facilitate running of the magnetic tape by the stationary drum.

FIG. 9B is a diagram showing values of coefficient of static friction measured when the bottom width $a_2'$ of the peak portions 22 shown in FIG. 7B is 50 μm and the pitch $a_2$ of the peak portions 22, i.e., width of the flat portions 23 is changed. As can be seen from FIG. 9B, with respect to the samples 35 having the same surface roughness, the larger the pitch $a_2$, i.e., width of the flat portions 23, the lower the coefficient of static friction μs. In other words, it is apparent that, when the height $b_2$ and bottom width $a_2'$ of the individual peak portions 22 are constant, the reduction of the number of the peak portions per unit area reduces the total area of the meniscuses, so that the coefficient of static friction μs is lowered. Further, like in FIG. 9A, the larger the surface roughness in the range from 0.5 to 3 m, the lower the coefficient of static friction μs, and the increase of the pitch $a_2$ makes it possible to obtain a satisfactorily low value of the coefficient of static friction μs without increasing the surface roughness to an excessive extent. For example, in the rotary head type magnetic recording-reproducing apparatus in the present example, it is desired that the stationary drum 4 has a surface roughness of 3 m or less, and, when peak portions and flat portions between the peak portions are formed on the circumferential surface 6, the coefficient of static friction becomes 0.3 or less, thus making it possible to suppress a trouble of the magnetic tape during the running, e.g., tracking error. In addition, in the rotary head type magnetic recording-reproducing apparatus in the present example, it is desired that the circumferential surface 6 of the stationary drum 4 has a surface roughness of 1 to 2 μm.

Figure 10:
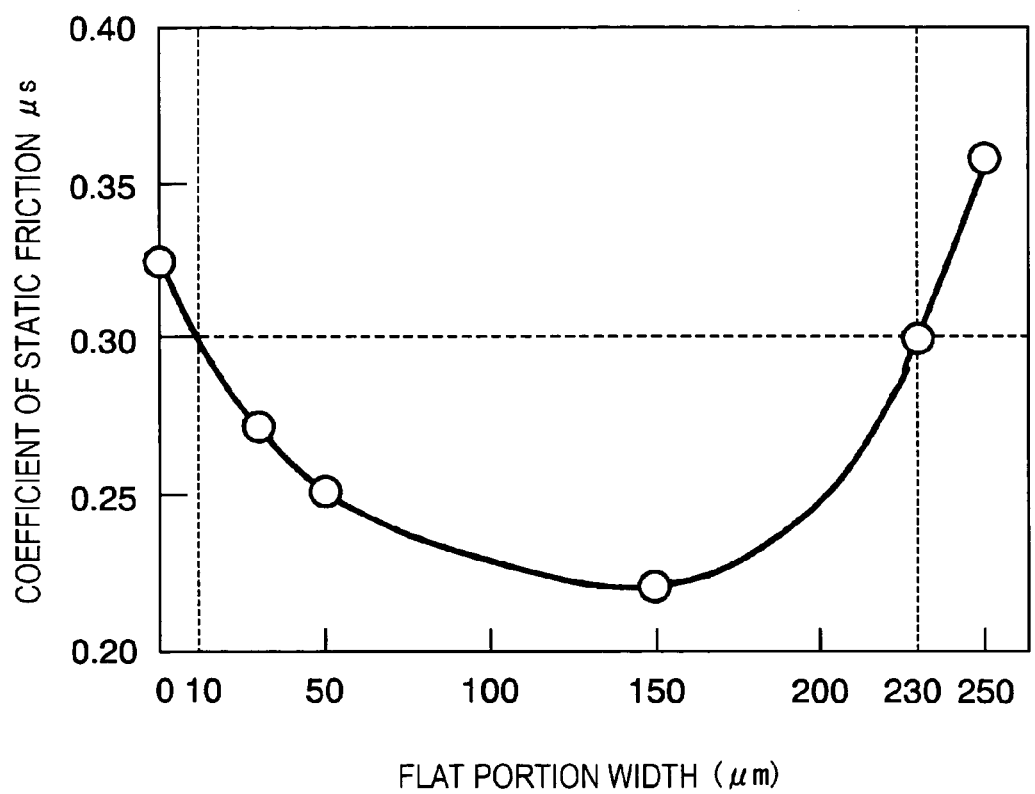
FIG. 10 is a characteristic diagram on which values of coefficient of static friction are plotted against a width of the flat portion.

Further, the relationship between the flat portion and the coefficient of static friction is described in detail with reference to FIG. 10. FIG. 10 is a diagram in which values of the coefficient of static friction measured by the same method and under the same conditions for measurement as those in the measurement for the coefficient of static friction shown in FIG. 9B are plotted against a width of the flat portion. The measurements were conducted with respect to the samples in which the width of the flat portion was 0, 30 μm, 50 μm, 150 μm, 230 μm, and 250 μm. In the rotary head type recording-reproducing apparatus in the present example, the circumferential surface of a preferred sliding portion, e.g., stationary drum, rotary drum, stationary guide, or rotary guide has a coefficient of static friction of 0.3 or less, and, as can be seen from FIG. 10, for achieving the coefficient of static friction μs of 0.3 or less, the width of the flat portion falls in the range from 10 to 230 μm. Further, when the width of the flat portion exceeds 150 μm, the coefficient of static friction μs tends to be increased. The reason why the coefficient of static friction μs is increased when the width of the flat portion exceeds 150 μm is presumed that, when the width of the flat portion is too large, the magnetic tape is sagged between the peak portions to increase the coefficient of static friction μs.

When recording or reproducing on a magnetic tape by the rotary head type recording-reproducing apparatus in the present example, for preventing the occurrence of tracking error, the upper limit value of the coefficient of static friction is 0.3, but the upper limit value of the coefficient of static friction varies depending on the conditions for the driving mechanism in the apparatus and the magnetic tape.

EXAMPLE 2

Figure 11:
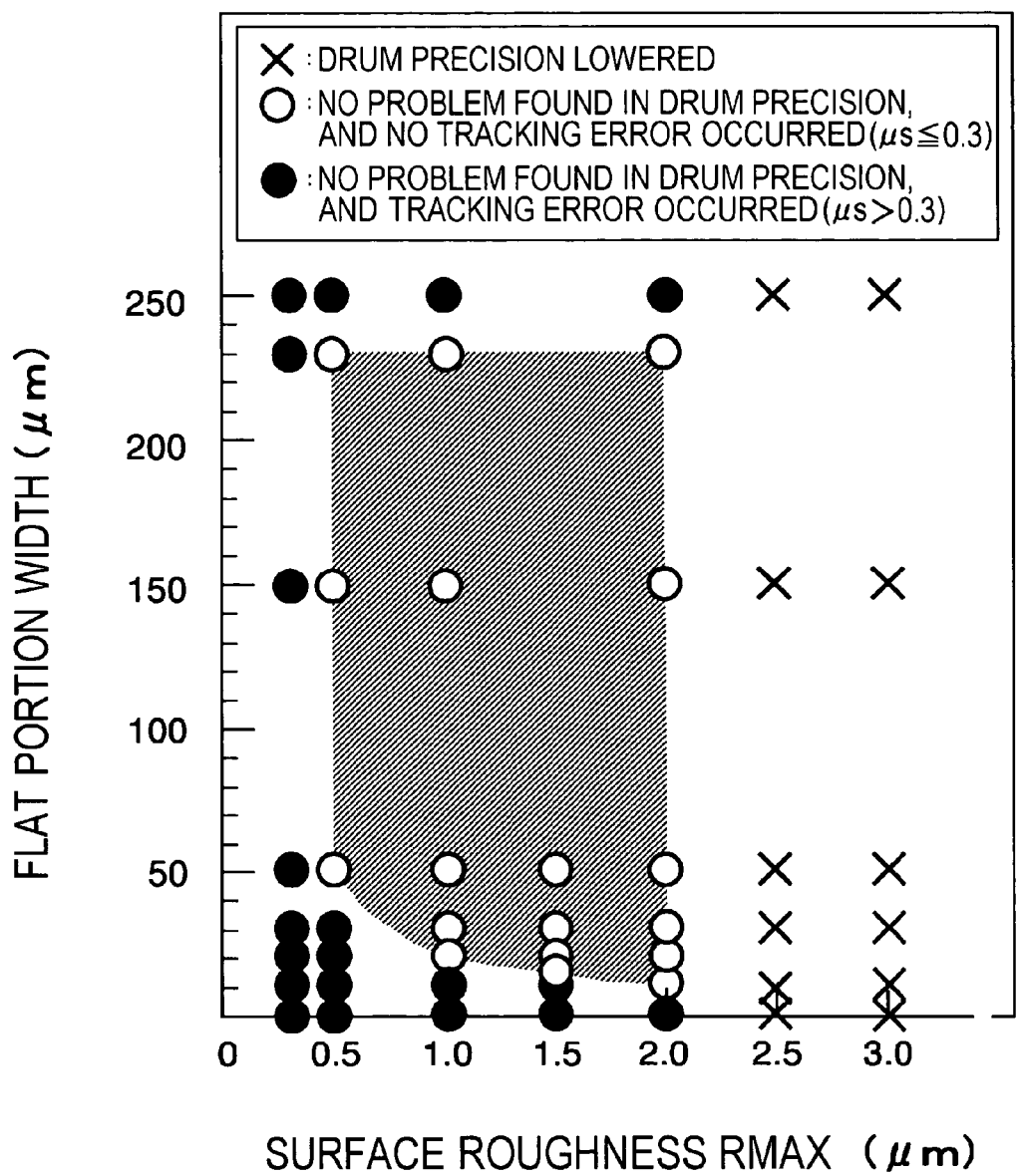
FIG. 11 is a diagram on which the occurrence of tracking error and a precision of the drum are ranked and plotted against the combination of a surface roughness and a width of the flat portions.

Next, with respect to the stationary drum used in the rotary head type recording-reproducing apparatus in the present example, the present inventor has made studies on the precision of the stationary drum and the occurrence of tracking error using as parameters a surface roughness defined as a maximum height Rmax of the peak portions and a width of the flat portions. FIG. 11 is a diagram on which the precision of the stationary drum and the occurrence of tracking error are ranked and plotted against the combination of a surface roughness of the circumferential surface of the stationary drum and a width of the flat portions. In FIG. 11, symbol X indicates the combination of the surface roughness and the width of the flat portions, which caused a practical problem with respect to the drum precision of the stationary drum, and symbol ○ (white circle) indicates the combination of the surface roughness and the width of the flat portions, which caused neither practical problem with respect to the drum precision of the stationary drum n or tracking error. Further, symbol ● (black circle) indicates the combination of the surface roughness and the width of the flat portions, which caused no practical problem with respect to the drum precision of the stationary drum but caused tracking error. In the combination of the surface roughness and the width of the flat portions used for the studies on the drum precision and tracking error, the surface roughness falls in the range from 0.3 to 3.0 μm and the width of the flat portions falls in the range from 0 to 250 μm. The environment conditions for the measurement are the same as the environment conditions used in Example 1.

As shown in FIG. 11, in each case where the peak portions and flat portions were formed on the circumferential surface of the stationary drum so that the surface roughness and the width of the flat portions became those plotted by the symbols ○, the coefficient of static friction μs was 0.3 or less. In addition, in each case where the peak portions and flat portions were formed so that the surface roughness and the width of the flat portions became those plotted by the symbols ●, the coefficient of static friction μs was 0.3 or more. Therefore, it has been found that the range defined by the symbols ○ shown in FIG. 11, i.e., the range of the combination of the surface roughness and the width of the flat portions corresponding to the shaded region shown in the figure is a preferred range of the combination of the width of the flat portions and the maximum height of the peak portions formed on the circumferential surface of the stationary drum in the present example. Specifically, it has been found that, under conditions such that the surface roughness falls in the range from 0.5 to 2.0 μm, the width of the flat portions has an upper limit of 230 μm and a lower limit within the range defined by a line formed by linking points (0.5, 50), (1.0, 20), (1.5, 15), and (2.0, 10) of the combination of the surface roughness (μm) and the width (μm) of the flat portions.

Therefore, not only in the stationary drum in the present example, but also in the sliding portion against which the magnetic tape is in sliding contact, e.g., rotary guide or stationary guide, when the circumferential surface is processed so that the maximum height of the peak portions and the width of the flat portions formed between the peak portions fall in the range corresponding to the shaded region shown in FIG. 11, the coefficient of static friction can be 0.3 or less. By selecting the surface roughness and the width of the flat portions in the above range, in the rotary head type recording-reproducing apparatus in the present example, the magnetic tape can run while being slid against the sliding portion, i.e., stationary drum, rotary guide, or stationary guide almost without causing tracking error.

Further, when the surface roughness and the width of the flat portions fall in the range corresponding to the shaded region shown in FIG. 11, the tension to which the magnetic tape is stretched by the rotary guide or rotary drum can be lowered, making it possible to prevent the magnetic tape from adhering to the surface of the stationary drum or stationary guide. Specifically, when the height of the peak portions formed on the circumferential surface of the stationary drum or stationary guide is too small, the smoothness of the circumferential surface of the rotary guide, stationary guide, or stationary drum is excess and hence the magnetic tape adheres to the surface, but, under the conditions in the range corresponding to the shaded region shown in FIG. 11, not only can the magnetic tape be prevented from adhering to the surface, but also a stick-slip phenomenon which occurs before the magnetic tape adheres to the surface of the stationary drum 4 or stationary guide can be suppressed.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. A magnetic tape apparatus for recording and/or reproducing information on a magnetic tape, the apparatus comprising:
a drum comprising:
a stationary drum portion including a sliding portion against which the magnetic tape is in sliding contact during operation of the apparatus; and
a rotary drum portion rotatably connected to said stationary drum portion by a shaft, the rotary drum portion including a magnetic head for recording and/or reproducing information on said magnetic tape;
wherein said sliding portion has a generally flat portion formed around a circumferential surface of said sliding portion so that the generally flat portion is substantially parallel to a sliding contact surface of said magnetic tape, and has plurality or peak portions formed around tho circumferential surface of the sliding portion so that said peak portions protrude from said fiat portion at a predetermined pitch;
wherein said flat portion and said peak portions are formed so as to extend generally circumferentially around the stationary drum and to be substantially parallel to a lead formed in said stationary drum for guiding the magnetic tape as it slides along the sliding portion of the drum;
wherein a surface roughness Rmax, defined as a maximum height of the peak portions, is between about 0.5 μm and about 2.0 μm; and
wherein a width of said flat portion is between about 10 μm and about 230 μm.

2. The magnetic tape apparatus according to claim 1, wherein said sliding portion is a guide for guiding said magnetic tape.

3. The magnetic tape apparatus according to claim 2, wherein the circumferential surface of said guide has a surface roughness of between about 1.0 μm and about 2.0 μm said surface roughness being a maximum height of said peak portions.

4. The magnetic tape apparatus according to claim 1, wherein the circumferential surface of said stationary drum has a surface roughness of between about 1.0 μm and about 2.0 μm, said surface roughness being a maximum height of said peak portions.

5. The magnetic tape apparatus according to claim 1, wherein said flat portion and said peak portions are formed in a spiral pattern around the sliding portion.

6. The magnetic tape apparatus according to claim 1, wherein said flat portion and said peak portions are formed at an oblique angle with respect to a circumference of the sliding portion.

7. The magnetic tape apparatus according to claim 1, further comprising:
   a stationary guide positioned adjacent said drum for guiding the magnetic tape to or from the drum, the stationary guide including a circumferential surface an upper flange connected to an upper portion of the circumferential surface of the stationary guide and a lower flange connected to a lower portion of the circumferential surface of the stationary guide; and
   a rotary guide positioned adjacent said drum for guiding the magnetic tape to or from the drum, the rotary guide being rotatable about an axis and including a circumferential surface, an upper flange connected to an upper portion of the circumferential surface of the rotary guide and a lower flange connected to a lower portion of the circumferential surface of the rotary guide;
   wherein the circumferential surface of the stationary guide and/or the circumferential surface of the rotary guide has a generally flat portion formed around the circumferential surface of the guide so the generally flat portion formed around the circumferential surface of the guide is substantially parallel to a contact surface of said magnetic tape, and has a plurality of peak portions formed around the circumferential surface of the guide so said peak portions formed around the circumferential surface of the guide protrude from said flat portion formed around the circumferential surface of the guide at a predetermined pitch.

8. The magnetic tape apparatus according to claim 1, wherein the flat portion has a concave form.

9. A magnetic tape apparatus for recording and/or reproducing information on a magnetic tape, the apparatus comprising:
   a drum comprising:
      a stationary drum portion including a sliding portion against which the magnetic tape is in sliding contact during operation of the apparatus; and
      a rotary drum portion rotatably connected to said stationary drum portion by a shaft, the rotary drum portion including a magnetic head for recording and/or reproducing information on said magnetic tape;
   wherein said sliding portion has a generally flat portion formed around a circumferential surface of said sliding portion so the generally flat portion is substantially parallel to a sliding contact surface of said magnetic tape;
   wherein the sliding portion has a plurality of peak portions formed around the circumferential surface of the sliding portion so said peak portions protrude from said flat portion at a predetermined pitch; and
   wherein the flat portion has a concave form.

10. The magnetic tape apparatus according to claim 9, further comprising:
   a stationary guide positioned adjacent said drum for guiding The magnetic tape to or from the drum, the stationary guide including a circumferential surface, an upper flange connected to an upper portion of the circumferential surface of the stationary guide and a lower flange connected to a lower portion of the circumferential surface of the stationary guide; and
   a rotary guide positioned adjacent said drum for guiding the magnetic tape to or from the drum, the rotary guide being rotatable about an axis and including a circumferential surface, an upper flange connected to an upper portion of the circumferential surface of the rotary guide and a lower flange connected to a lower portion of the circumferential surface of the rotary guide;
   wherein the circumferential surface of the stationary guide and/or the circumferential surface of the rotary guide has a generally flat portion formed around the circumferential surface of the guide so the generally flat portion formed around the circumferential surface of the guide is substantially parallel to a contact surface of said magnetic tape, and has a plurality of peak portions formed around the circumferential surface of the guide so said peak portions formed around the circumferential surface of the guide protrude from sad flat portion formed around the circumferential surface of the guide at a predetermined pitch.

* * * * *